United States Patent Office 3,553,323
Patented Jan. 5, 1971

3,553,323
METHOD OF CONTROLLING RICE BLAST WITH THIOLPHOSPHATES
Masaru Kado and Taizo Maeda, Shimizu, and Eiichi Yoshinaga, Ogasa-gun, Japan, assignors to Kumiai Chemical Industries Co., Ltd., Tokyo, Japan
No Drawing. Filed July 6, 1965, Ser. No. 469,905
Claims priority, application Japan, Mar. 31, 1965, 40/18,285
Int. Cl. A01n 9/36
U.S. Cl. 424—225    17 Claims

ABSTRACT OF THE DISCLOSURE

Undesired fungous growth is combatted by applying to the locus to be protected a fungicidally effective amount of a compound of the formula $$(RO)_2\overset{O}{\overset{\|}{P}}-S-A-\text{C}_6\text{H}_5$$

wherein R is a lower alkyl radical, A is a radical selected from the group consisting of straight and branched chain alkylene radicals having 2 to 10 carbon atoms, in the presence of an inert carrier. These compositions are particularly useful for controlling noxious fungous organisms attacking agricultural products, more especially rice blast (*Piricularia oryzae*).

---

The present invention relates to novel phosphates to be used as agricultural medicines, more particularly to phosphates useful for fungicides and a method producing them.

The novel phosphates of the invention are represented by the following general formula $$\begin{array}{c}RO\\ \diagdown\\ RO\end{array}\overset{O}{\overset{\|}{P}}-S-A-\text{C}_6\text{H}_5$$

wherein R is a lower alkyl group and A is straight or branched alkylene radical having 2–10 carbon atoms.

As the examples of said phosphates, the following compounds may be specified.

(1) O,O-dimethyl-S-(2-phenylethyl)thiolophosphate

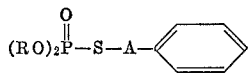

(2) O,O-diethyl-S-(2-phenylethyl)thiolophosphate

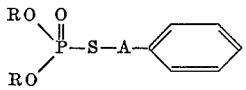

(3) O,O-diethyl-S-(1-phenylethyl)thiolophosphate

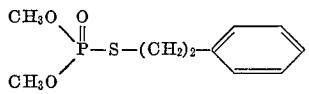

(4) O,O-dimethyl-S-(3-phenylpropyl)thiolophosphate

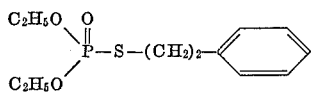

(5) O,O-diethyl-S-(3-phenylpropyl)thiolophosphate

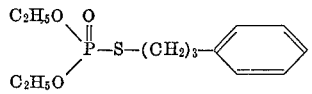

(6) O,O-diethyl-S-(1-methyl - 2 - phenylethyl)thiothophosphate

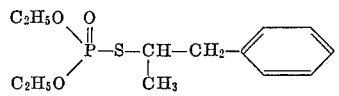

(7) O,O-diethyl-S-(4-phenylbutyl)thiolophosphate

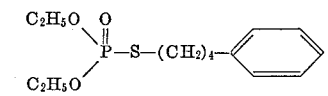

(8) O,O-dimethyl-S-(1,1-dimethyl - 3 - phenylpropyl)thiolophosphate

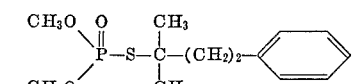

(9) O,O-diethyl-S-(5-phenylpentyl)thiolophosphate

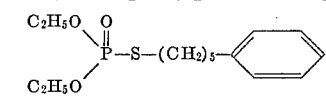

(10) O,O - di - n - propyl-S-(6-phenylhexyl)thiolophosphate

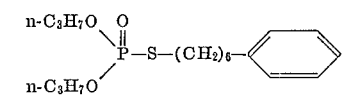

(11) O,O - dimethyl-S-(5-phenyl-hexyl)thiolophosphate

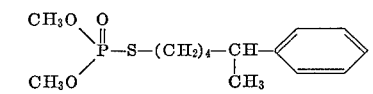

(12) O,O-dimethyl-S-(1-methyl-5-phenylpentyl)thiolophosphate

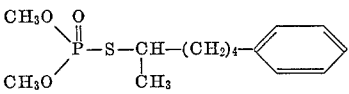

(13) O,O - diethyl-S-(1-methyl-5-phenylhexyl)thiolophosphate

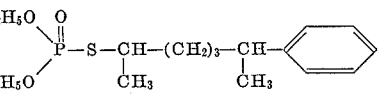

(14) O,O - diethyl-S-(1-methyl-7-phenylheptyl)thiolophosphate

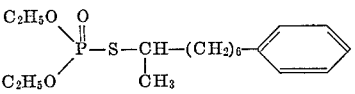

(15) O,O-diethyl-S-(1-methyl - 8 - phenyloctyl)thiolophosphate

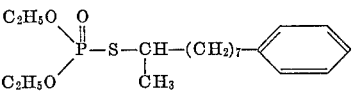

(16) O,O-diethyl-S-(10-phenyldecyl)thiolophosphate

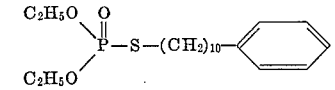

All of the phosphates according to the invention are novel compounds which are not reported before and it has been found by the invention that they have fungicidal activity and are useful for combatting and controlling noxious organisms particularly in agriculture.

Among pesticides to be used for protecting plants, fungicide has previously consisted mainly of copper, mercury and sulfur compositions, but recently the fungicides such as quinone and carbamate series and antibiotics have been developed.

However each of these compositions has some advantages and disadvantages. For example, there are disadvantages that some of them readily cause phytotoxicity, have no activity against some species of fungi, or require very careful handlings.

Particularly the activity of conventional fungicides against the rice blast (*Piricularia oryzae*), which is the most hazardous pest in rice growing, is poor, and only organomercury compositions or antibiotic compositions have been used.

However, organomercury compositions are toxic to human beings, requiring extreme care in handling and, because of residues in the hulls etc., presenting special health problems after use in the rice fields.

Furthermore, mercury is low in the production and internationally precious material, so that it is disadvantageous and is not an advisable means to spread the composition on field in such a manner as to be impossible to recover.

Accordingly, development of non-heavy metal fungicides have been recently desired.

The inventors have newly synthesized various non-heavy metal compounds for the purpose of preventing the rice blast and other noxious fungi for plants and investigated the activity thereof, resulting in discovery of the fact that the compounds represented by the above described general formula show very high activity against various noxious fungi for agriculture such as *Piricularia oryzae* (pathogene of the rice blast), also show no phytotoxicity. The active components (compounds) in the invention are organophosphorus compounds quite different from those of conventional fungicides and among organophosphorus compounds only Wepsyn (trade name for 5-amino-3-phenyl-1-bis(dimethylamino)phosphoryl-1, 2,4-triazole; Philips Duphar) is known as a fungicide.

The compositions of the invention do not contain heavy metal and have no risk to cause chronic poison to human body so that they can be used safely, have therapeutical fungicidal effect by applying to affected area and preventive fungicidal effect by applying previously to area where generation of the disease is anticipated.

The novel phosphates according to the invention can be produced by mixing alkali metal salts or ammonium salts of dialkylmonothiophosphate and halogenated aliphatic benzene in a solvent such as acetone, alcohols and (or) benzene and reacting the mixture according to the following equation.

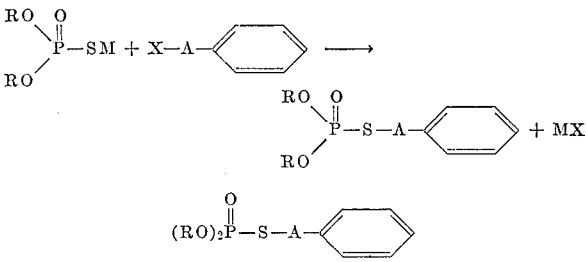

wherein X is a halogen atom, M is an alkalimetal atom or ammonium radical and R and A have the above described meanings.

In the practice of the production, both starting materials are mixed in a suitable solvent and the mixture is heated to react them and after completion of the reaction, separation or purification is effected by further steps such as concentration, filtration or distillation to obtain readily the product in a high yield.

The term suitable "solvent" used here means one which does not after the reaction in such a manner as to react with each starting material or the product, or decompose these substances. Also it is preferable that the solvent has solubility to either or all of the starting materials and the product. The solvent above explained may be chosen from the group consisting of organic and inorganic solvents, for example alcohols such as methanol, ethanol, ketones such as acetone, methylethylketone, ethers such as diethylether, tetrahydrofuran, aromatic hydrocarbons such as benzene, toluene, halogenized hydrocarbons such as chloroform, trichlene, esters such as ethylacetate, methylacetate, DMF or DMSO or water. They are respectively used solely or in combination. All the products thus obtained are clear liquids and have special odors.

Furthermore, they have good stability and unless they are subjected to severe conditions for a long time any change or decomposition does not occur. Therefore under a moderate condition purification by distillation can be effected and in this case the distillates are generally colorless or light yellow (yellow in some case).

The nature of the invention will readily be understood from the following examples which are illustrative but not limiting.

In these examples, all parts are by weight, unless otherwise specified.

EXAMPLE 1

Production of O,O,-dimethyl-S-(2-phenylethyl) thiolophosphate

To 15.9 parts of ammonium dimethylthiophosphate (M.P. 70–73° C.) dissolved in 200 parts by volume of methylethylketone was added dropwise a solution of 18.5 parts of 2-phenylethyl bromide (B.P. 217° C./760) in 50 parts by volume of benzene while stirring and the mixture was heated to the boiling point of the solvent and stirred for 2 hours to complete the reaction.

After cooled the separated ammonium bromide was filtered off and from the filtrate was distilled off the solvent. The residue was mixed with 150 parts by volume of benzene thoroughly, washed with water, dried and then benzene was distilled off. The residual oil was distilled off under vacuum to obtain 16.5 parts of the product and 68.9% of theoretical yield, which was colorless and limpid oil. Boiling point 115–118° C./0.5 mm. Hg.

EXAMPLE 2

Production of O,O-diethyl-S-(2-phenylethyl) thiolophosphate 17.7 parts of ammonium diethylthiophosphate (M.P. 144–145.5° C.) were dissolved in 150 parts by volume of acetone and to the solution 18.5 parts of 2-phenylethyl bromide were added dropwise while heating the solution to reflux acetone. The mass became whitely muddy and reacted. After the addition, the heating and refluxing were continued for 3 hours, after which the mass was treated in the same manner as described in Example 1 to obtain 23.0 parts of the product and 83.9% of yield, which was colorless and limpid oil. Boiling point 150–155° C./0.4 mm. Hg.

EXAMPLE 3

Production of O,O-diethyl-S-(1-phenylethyl)thiolophosphate 20.8 parts of potassium diethylthiophosphate (M.P. 195–196.5° C.) were suspended in 250 parts by volume of benzene thoroughly and to the suspension were added 14.1 parts of 1-phenylethyl chloride (B.P. 194–195° C./750). The mixture was heated to reflux for 14 hours while stirring.

After cooled, the mass was washed twice with 100 times water and dried, after which benzene was distilled off and the residue as distilled under vacuum to obtain 23.5 parts of the product and 85.6% of yield, which was

EXAMPLE 4

Production of O,O-diethyl-S-(3-phenylpropyl)thiolophosphate 20.8 parts of potassium diethylthiophosphate and 19.9 parts of 3-phenylpropyl bromide are reacted and treated in acetone in the same manner as described in Example 2 to obtain 23.9 parts of the product and 83.9% of yield, which was yellow and limpid oil. Boiling point 132–138° C./0.01 mm. Hg.

EXAMPLE 5

Production of O,O-dimethyl-S-(3-phenylpropyl)thiolophosphate 18.0 parts of potassium dimethylthiophosphate were dissolved in 200 parts by volume of acetone and to the solution was slowly added dropwise a solution of 19.9 parts of 3-phenylpropyl bromide in 50 parts by volume of acetone while stirring, after which the mass was treated in the same manner as described in Example 2 to obtain 19.8 parts of the product, which was colorless and limpid oil. Boiling point 115–118° C./0.005 mm. Hg.

EXAMPLE 6

Production of O,O-diethyl-S-(4-phenylbutyl)thiolophosphate 20.8 parts of potassium diethylthiophosphate and 21.3 parts of 4-phenylbutyl bromide (B.P. 135–138° C./20) were reacted and treated in the same manner as described in Example 2 to obtain 23.5 parts of the product and 77.8% of yield, which was colorless and limpid oil. Boiling point 152–156° C./0.15 mm. Hg.

EXAMPLE 7

Production of O,O-diethyl-S-(1-methyl-2-phenylethyl)-thiolophosphate

Into a solution of 20.8 parts of potassium diethylthiophosphate in 200 parts by volume of acetone was slowly added a solution of 19.9 parts of 2-phenyl-1-methylethyl bromide in 50 parts by volume of acetone dropwise, after which the mass was treated in the same manner as described in Example 2 to obtain 17.0 parts of the product. Boiling point 136–139° C./0.01–0.015 mm. Hg.

EXAMPLE 8

Production of O,O-diethyl-S-(1,1-dimethyl-3-phenylpropyl)thiolophosphate

Into a solution of 18.0 parts of potassium diethylthiophosphate in 200 parts by volume of acetone was slowly added a solution of 22.7 parts of 3-phenyl-1,1-dimethylpropyl bromide in 50 parts by volume of acetone while stirring, after which the mass was treated in the same manner as described in Example 2 to obtain 15.4 parts of the product with boiling point of 120–125° C./0.01 mm. Hg.

EXAMPLE 9

Production of O,O-diethyl-S-(5-phenylpentyl)thiolophosphate 20.8 parts of potassium diethylthiophosphate and 22.7 parts of 5-phenylpentyl bromide were reacted in acetone in the same manner as described in Example 2 to obtain 25.8 parts of the product and 81.6% of yield, which was colorless and limpid oil. Boiling point 153–157° C./0.03 mm. Hg.

EXAMPLE 10

Production of O,O-di-n-propyl-S-(6-phenylhexyl)-thiolophosphate

Into a solution of 23.6 parts of potassium di-n-propyl-thiophosphate in 200 parts by volume of acetone was slowly added dropwise a solution of 24.1 parts of 6-phenylhexyl bromide in 50 parts by volume of acetone while stirring, after which the mass was treated in the same manner as described in Example 2 to obtain 13.7 parts of the product. Boiling point 152–156° C./0.01–0.08 mm. Hg.

EXAMPLE 11

Production of O,O-dimethyl-S-(5-phenylhexyl)thiolophosphate

Into a solution of 18.0 parts of potassium dimethyl-thiophosphate in 200 parts by volume of acetone was slowly added dropwise a solution of 24.1 parts of 5-phenylhexyl bromide in 50 parts by volume of acetone while stirring, after which the mass was treated in the same manner as described in Example 2 to obtain 13.7 parts of the product. Boiling point 150–153° C./0.015 mm. Hg.

EXAMPLE 12

Production of O,O-dimethyl-S-(1-methyl-5-phenylpentyl)thiolophosphate

Into a solution of 18.0 parts of potassium dimethyl-thiophosphate in 200 parts by volume of acetone was slowly added dropwise a solution of 24.1 parts of 5-phenyl-1-methylpentyl bromide in 50 parts by volume of acetone while stirring, after which the mass was treated in the same manner as described in Example 2 to obtain 12.7 parts of the product. Boiling point 143–145° C./0.02 mm. Hg.

EXAMPLE 13

Production of O,O-diethyl-S-(1-methyl-5-phenylhexyl)thiolophosphate

Into a solution of 20.8 parts of potassium diethylthiophosphate in 200 parts by volume of acetone was slowly added dropwise a solution of 25.5 parts of 5-phenyl-1-methylhexyl bromide in 50 parts by volume while stirring, after which the mass was treated in the same manner as described in Example 2 to obtain 14.9 parts of the product. Boiling point 135–139° C./0.0015 mm. Hg.

EXAMPLE 14

Production of O,O-diethyl-S-(1-methyl-7-phenylheptyl)-thiolophosphate

Into a solution of 20.8 parts of potassium diethylthiophosphate in 200 parts by volume of acetone was slowly added dropwise a solution of 26.9 parts of 7-phenyl-1-methylheptyl bromide in 50 parts by volume of acetone while stirring, after which the mass was treated in the same manner as described in Example 2 to obtain 17.1 parts of the product. Boiling point 150–158° C./0.005 mm. Hg.

EXAMPLE 15

Production of O,O-diethyl-S-(1-methyl-8-phenyloctyl)-thiolophosphate

Into a solution of 20.8 parts of potassium diethylthiophosphate in 200 parts by volume of acetone was slowly added dropwise a solution of 28.3 parts of 8-phenyl-1-methyloctyl bromide in 50 parts by weight of acetone while stirring, after which the mass was treated in the same manner as described in Example 2 to obtain 17.1 parts of the product. Boiling point 160–164° C./0.015 mm. Hg.

EXAMPLE 16

Production of O,O-diethyl-S-(10-phenyldecyl)-thiolophosphate 19.2 parts of sodium diethylthiophosphate (M.P. 188–190° C.) were dissolved in 200 parts by volume of acetone by heating and into the solution was added dropwise a solution of 29.7 parts of 10-phenyldecyl bromide (B.P. 152–153° C./0.08 mm. Hg) in 50 parts by volume of acetone while stirring. The mass was stirred for 3 hours while heating to reflux acetone, after which it was treated in the same manner as described in Example 1 to obtain 15.0 parts of the object product and 16.4 parts of 10-phenyldecyl bromide of the starting material. The yield was 39.7%, which corresponds to 86.1% considering the recovery of the starting material. The product was colorless and limpid oil. Boiling point 162–165° C./0.08 mm. H.

The fungicidal compositions having these compounds as active component can be prepared by mixing said compounds with carrier. The term "carrier" used herein means diluents or additives to be used for carrying the active component to a desired area, which may be both solid and liquid.

For example, as solid carrier use may be made of various clay, pyrophyllite, talc, diatomaceous earth, silica and vermiculite. As liquid carrier, use may be made of solvent for the compounds (active components) and non-solvent which can disperse or dissolve the active component by means of an auxiliary agent, for example, water, benzene, kerosine, alcohols, acetones, xylene, methyl-naphthalene, cyclohexanone, animal and vegetable oils, fatty acids, esters of fatty acids and surfactants.

EXAMPLE 17

Methods of preparing and using dust 3 parts of O,O-diethyl-S-(3-phenylpropyl)thiolophosphate and 97 parts of a mixture of diatomaceous earth and Dicrite (trade-name of a clay) were mixed and milled to prepare dust, which was used by dusting directly.

EXAMPLE 18

Methods of preparing and using wettable powder 15 parts of O,O-diethyl-S-(4-phenylbutyl)thiolophosphate, 80 parts of mixture of diatomaceous earth and kaolin and 5 parts of spreader, Emale (trade-name) were mixed and milled to prepare wettable powder, which was used as the suspension having concentration of 300–1,000 p.p.m. (as active component).

EXAMPLE 19

Methods of preparing and using emulsifiable concentrate 25 parts of O,O-diethyl-S-(5-phenylpentyl)thiolophosphate, 55 parts of xylene and 25 parts of emulsifier, New Kalgen (trade-name) were mixed and dissolved to prepare emulsifiable concentrate, which was used as emulsion having concentration of 300–1,000 p.p.m. (as active component) in water.

Furthermore, in the case of use, it is naturally preferable to ensure the effect by mixing an auxiliary agent, for example surfactants such as adhesive, emulsifier, spreader and sticker.

The fungicidal compositions according to the invention can be used by mixing insecticides such as BHC or parathion, fungicides comprising various sulphur compounds, copper compounds and mercury compounds as active component or plant growth controlling agent such as 2.4–D.

The results of test for preventing the rice blast (*Piricularia oryzae*) by using the new phosphates are shown as experimental examples.

EXPERIMENTAL EXAMPLE 1

Test of preventing rice blast by means of emulsifiable cencentrate

Paddy field rice plant (specie, *Aichi asahi*) was planted in a pot having diameter of 15 cm. At the young ears formation period of the plant, the fungicidal compositions of the invention, prepared in emulsifiable concentrate form according to Example 19 and diluted by water, were spread. On the next day, a suspension of spores of rice blast taken from the diseased leaves was inoculated by spraying. One week after the inoculation the number of diseased spots on the upper leaves were checked. The average values of three groups are shown in the following table.

| Name of active ingredient | Concentration (p.p.m.) | Number of diseased spots per average 10 leaves |
|---|---|---|
| O,O-dimethyl-S-(2-phenylethyl)-thiolophosphate | 1,000 | 21 |
| O,O-diethyl-S-(2-phenylethyl) thiolophosphate | 1,000 | 26 |
| O,O-diethyl-S-(1-phenylethyl) thiolophosphate | 1,000 | 26 |
| O,O-diethyl-S-(3-phenylpropyl) thiolophosphate | 1,000 | 16 |
| O,O-dimethyl-S-(3-phenylpropyl) thiolophosphate | 1,000 | 34 |
| O,O-diethyl-S-(4-phenylbutyl) thiolophosphate | 1,000 | 48 |
| O,O-diethyl-S-(1-methyl-2-phenylethyl)thiolophosphate | 1,000 | 28 |
| O,O-dimethyl-S-(1,1-dimethyl-3-phenylpropyl)thiolophosphate | 1,000 | 32 |
| O,O-diethyl-S-(5-phenylpentyl)thiolophosphate | 1,000 | 11 |
| O,O-di-n-propyl-S-(6-phenylhexyl)thiolophosphate | 1,000 | 40 |
| O,O-dimethyl-S-(5-phenylhexyl)thiolophosphate | 1,000 | 40 |
| O,O-dimethyl-S-(1-methyl-5-phenylpentyl)thiolophosphate | 1,000 | 36 |
| O,O-diethyl-S-(1-methyl-5-phenylhexyl)thiolophosphate | 1,000 | 20 |
| O,O-diethyl-S-(1-methyl-7-phenylheptyl)thiolophosphate | 1,000 | 30 |
| O,O-diethyl-S-(1-methyl-8-phenyloctyl)thiolophosphate | 1,000 | 29 |
| O,O-diethyl-S-(10-phenyldecyl)thiolophosphate | 1,000 | 27 |
| Phenylmercuric acetate (comparing agent) | 50 | 43 |
| Non-spread | | 237 |

EXPERIMENTAL EXAMPLE 2

Test of preventing rice blast by means of dust

Paddy field rice plant (specie, *Aichi asahi*) was planted in a pot having diameter of 15 cm. and at the young ears formation period of the plant, the fungicidal compositions of the invention, prepared in dust form as in Example 17, were spread. On the next day, a suspension of spores of rice blast taken from the diseased leaves was inoculated by spreading. One week after the inoculation

| Name of active ingredient | Concentration (percent) | Number of diseased spots per average 10 leaves |
|---|---|---|
| O,O-dimethyl-S-(2-phenylethyl)thiolophosphate | 3 | 11 |
| O,O-diethyl-S-(2-phenylethyl)thiolophosphate | 3 | 29 |
| O,O-diethyl-S-(1-phenylethyl)thiolophosphate | 3 | 23 |
| O,O-diethyl-S-(3-phenylpropyl)thiolophosphate | 3 | 19 |
| O,O-dimethyl-S-(3-phenylpropyl)thiolophosphate | 3 | 24 |
| O,O-diethyl-S-(1-methyl-2-phenylethyl)thiolophosphate | 3 | 15 |
| O,O-diethyl-S-(4-phenylbutyl)thiolophosphate | 3 | 34 |
| O,O-dimethyl-S-(1,1-dimethyl-3-phenylpropyl)thiolophosphate | 3 | 39 |
| O,O-diethyl-S-(5-phenylpentyl)thiolophosphate | 3 | 0 |
| O,O-di-n-propyl-S-(6-phenylhexyl)thiolophosphate | 3 | 52 |
| O,O-dimethyl-S-(5-phenylhexyl)thiolophosphate | 3 | 50 |
| O,O-dimethyl-S-(1-methyl-5-phenylpentyl)thiolophosphate | 3 | 34 |
| O,O-diethyl-S-(1-ethyl-5-phenylhexyl)thiolophosphate | 3 | 22 |
| O,O-diethyl-S-(1-methyl-7-phenylheptyl)thiolophosphate | 3 | 39 |
| O,O-diethyl-S-(1-methyl-8-phenyloctyl)thiolophosphate | 3 | 22 |
| Non-spread | | 237 |

What we claim is:

1. A method of controlling and killing rice blast which comprises contacting said fungi with a fungicidally effective amount of a compound of the formula

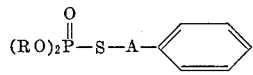

wherein R is a lower alkyl radical and A is a radical selected from the group consisting of straight chain and branched chain alkylene having 2 to 10 carbon atoms, and an inert carrier.

2. A method according to claim 1, wherein said compound is O,O-dimethyl-S-(2-phenylethyl)thiolophosphate.

3. A method according to claim 1, wherein said compound is O,O-diethyl-S-(2-phenylethyl)thiolophosphate.

4. A method according to claim 1, wherein said compound is O,O-diethyl-S-(1-phenylethyl)thiolophosphate.

5. A method according to claim 1, wherein said compound is O,O-diethyl-S-(3-phenylpropyl)thiolophosphate.

6. A method according to claim 1, wherein said compound is O,O - dimethyl-S-(3 - phenylpropyl)thiolophosphate.

7. A method according to claim 1, wherein said compound is O,O - diethyl-S-(1-methyl-2-phenylethyl)thiolophosphate.

8. A method according to claim 1, wherein said compound is O,O-diethyl-S-(4-phenylbutyl)thiolophosphate.

9. A method according to claim 1, wherein said compound is O,O - dimethyl-S-(1,1-dimethyl-3-phenylpropyl)thiolophosphate.

10. A method according to claim 1, wherein said compound is O,O-diethyl-S-(5-phenylpentyl)thiolophosphate.

11. A method according to claim 1, wherein said compound is O,O-di-n-propyl-S-(6 - phenylhexyl)thiolophosphate.

12. A method according to claim 1 wherein said compound is O,O-dimethyl - S - (5 - phenylhexyl)thiolophosphate.

13. A method according to claim 1, wherein said compound is O,O-dimethyl - S - (1 - methyl-5 - phenylpentyl)-thiolophosphate.

14. A method according to claim 1, wherein said compound is O,O - diethyl-S-(1-methyl-5-phenylhexyl)thiolophosphate.

15. A method according to claim 1, wherein said compound is O,O-diethyl-S-(1-methyl-7-phenylheptyl)thiolophosphate.

16. A method according to claim 1, wherein said compound is O,O - diethyl-S-(1-methyl-8-phenyloctyl)thiolophosphate.

17. A method according to claim 1, wherein said compound is O,O-diethyl-S-(10-phenyldecyl)thiolophosphate.

References Cited

UNITED STATES PATENTS 3,357,882 12/1967 Scheinpflug et al. ___ 424—225X
2,976,309 3/1961 Schrader et al. ____ 260—963X

OTHER REFERENCES

"Zhur Obschehii Khim," vol. 29, No. 5 (1959), pp. 1612–1614.

ALBERT T. MEYERS, Primary Examiner

D. R. ORE, Assistant Examiner

U.S. Cl. X.R.

260—963; 424—357